United States Patent
Li et al.

(10) Patent No.: US 11,477,722 B2
(45) Date of Patent: Oct. 18, 2022

(54) CHANGING ACCESS CONTROL PARAMETERS IN A WIRELESS NETWORK

(71) Applicant: ZTE Corporation, Guangdong (CN)

(72) Inventors: Dapeng Li, Guangdong (CN); Qian Dai, Guangdong (CN); Wenting Li, Guangdong (CN); Yuan Gao, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 16/925,127

(22) Filed: Jul. 9, 2020

(65) Prior Publication Data
US 2020/0344670 A1 Oct. 29, 2020

Related U.S. Application Data

(63) Continuation of application No. PCT/CN2018/072104, filed on Jan. 10, 2018.

(51) Int. Cl.
| | |
|---|---|
| *H04W 48/08* | (2009.01) |
| *H04W 76/27* | (2018.01) |
| *H04W 28/02* | (2009.01) |
| *H04W 48/02* | (2009.01) |
| *H04W 48/16* | (2009.01) |
| *H04W 68/02* | (2009.01) |

(52) U.S. Cl.
CPC ....... *H04W 48/08* (2013.01); *H04W 28/0289* (2013.01); *H04W 48/02* (2013.01); *H04W 48/16* (2013.01); *H04W 68/02* (2013.01); *H04W 76/27* (2018.02)

(58) Field of Classification Search
CPC . H04W 76/27; H04W 48/08; H04W 28/0289; H04W 48/02; H04W 48/16; H04W 68/02
See application file for complete search history.

(56) References Cited

U.S. PATENT DOCUMENTS

| | | | |
|---|---|---|---|
| 2019/0059074 A1* | 2/2019 | Ozturk | H04W 52/0216 |
| 2019/0174449 A1* | 6/2019 | Shan | H04W 60/00 |
| 2019/0306827 A1* | 10/2019 | Agiwal | H04W 48/12 |

FOREIGN PATENT DOCUMENTS

| | | |
|---|---|---|
| CN | 103313346 A | 9/2013 |
| CN | 103702367 A | 4/2014 |
| CN | 103813286 A | 5/2014 |
| CN | 104717693 A | 6/2015 |
| CN | 106165494 A | 11/2016 |
| CN | 106413036 A | 2/2017 |

(Continued)

OTHER PUBLICATIONS

Huawei et al., "Access control in NR," 3GPP TSG-RAN WG2 Meeting #95bis, Kaohsiung, 2 pages, R2-166810, Oct. 2016.

(Continued)

*Primary Examiner* — Diane D Mizrahi
(74) *Attorney, Agent, or Firm* — Perkins Coie LLP (57) ABSTRACT

A network node transmits an indication of a change to access control parameters, wherein the indication includes one or more of an operator information, a unified access control type, access identities, network slice information, session information, an indication to prohibit new service access attempt, an indication to alleviate prohibition of new service access attempt and a radio resource control state.

8 Claims, 5 Drawing Sheets

(56) References Cited

FOREIGN PATENT DOCUMENTS

| CN | 106658758 A | 5/2017 |
|---|---|---|
| CN | 107223351 A | 9/2017 |
| WO | 2013126509 A1 | 8/2013 |
| WO | 2016027133 A1 | 2/2016 |

OTHER PUBLICATIONS

CATT, "Access control mechanism in NR," 3GPP TSG-RAN WG2 Meeting #99, Berlin, Germany, R2-1707910, 3 pages, Aug. 2017.
ZTE, "Consideration on the access control in NR," 3GPP TSG-RAN WG2 Meeting #99, Berlin, Germany, R2-1708111, 6 pages, Aug. 2017.
Office Action for Chinese Patent Application No. 201880078208.1, dated Jan. 4, 2021.
International Search Report and Written Opinion dated Aug. 6, 2018 for International Application No. PCT/CN2018/072104, filed on Jan. 10, 2018 (7 pages).
Samsung, "Remaining aspects of PBCH and Some SIB1 contents", 3GPP TSG-RAN WG2 99Bis meeting, Prague, Czech Republic, R2-1711743, 6 pages, Oct. 2017.
Qualcomm Incorporated, "PBCH contents and payload size consideration", 3GPP TSG-RAN WG1 90, Prague, Czech Republic, R1-1713374, 4 pages, Aug. 2017.
Office Action for Chinese Patent Application No. 201880078208.1, dated Nov. 2, 2021 (14 pages).
Office Action for Chinese Patent Application No. 201880078208.1, dated Jun. 11, 2021 (12 pages).

\* cited by examiner

CHANGING ACCESS CONTROL PARAMETERS IN A WIRELESS NETWORK

CROSS REFERENCE TO RELATED APPLICATIONS

This patent document is a continuation of and claims benefit of priority to international Patent Application No. PCT/CN2018/072104, filed on Jan. 10, 2018. The entire content of the before-mentioned patent application is incorporated by reference as part of the disclosure of this application.

TECHNICAL FIELD

This patent document generally relates to systems, devices, and techniques for wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to support much deeper coverage and huge number of connections.

SUMMARY

This patent document describes techniques for changing access control parameters in a wireless network. In some implementations, a network node, such as a gNB, may transmit an indication that access control parameters have been changed. A wireless device that receives the indication may perform additional steps to acquire the changed access control parameters or comply with the changes. Using the disclosed techniques, a network node may be able to perform congestion control when network bandwidth utilization changes.

In one example aspect, a wireless communication method is disclosed. The method includes transmitting, from a network node, an indication of a change to access control parameters, wherein the indication comprises one or more of an operator information, a unified access control type, access identities, network slice information, session information, an indication to prohibit new service access attempt, an indication to alleviate prohibition of new service access attempt and a radio resource control state.

In another example aspect, a method of wireless communication includes receiving, at a user device operating in a radio resource control (RRC) connected state, a dedicated message informing the user device of changes to access control parameters, the dedicated message comprising at least one parameter, and performing, selectively based on a value of the at least one parameter at least one of the following actions: (a) in response to the parameter corresponding to a uniform access control type, updating a locally stored copy of the parameter, (b1) in response to the parameter indicating that the user device is exempted from prohibiting establishing a new service, then checking whether the new service can be established using the locally stored copy of the parameter, and (b2) otherwise, prohibiting new services access attempt from accessing network.

In another example aspect, a method of wireless communication includes receiving, by a user device in a radio resource control active or inactive state or idle state, a paging message informing the user device of changes to access control parameters, the paging message include at least one parameter, and performing, selectively based on a value of the at least one parameter at least one of the following actions: (a) in response to the indication that access control parameter has been changed, reading a next RMSI or OSI information of access control parameter that carries a connected/inactivity status change and updating a locally stored copy of the parameter, (b) in response to the indication that access control parameter has been changed, then transmitting a dedicated message to acquire new access control parameters, (c) in response to the indication that terminal is not permitted new service access attempt, then prohibiting a new service access attempt from accessing network, (d) in response to the indication that terminal is exempted from prohibit new service access attempt, then check whether new service connection is allowed using stored control parameters.

In another example aspect, a wireless communication apparatus comprising processor electronics configured to implement the above-described methods is disclosed.

In another example aspect, instructions for implementing the above-described methods by a processor may be stored on a computer-readable program medium.

These, and other, aspects are described in greater detail in the present document.

DETAILED DESCRIPTION

The disclosed technology provides implementations and examples of changing access control parameters in a wireless network.

With the rapid development of mobile communications technology, wireless communication has entered into all aspects of people's work, and social life. Mobile communication has brought tremendous influence to people's life style, work style and social, political and economic aspects. Human society has entered an era of informationization, and a variety of business applications have shown explosive growth in demand for wireless bandwidth. Future mobile networks are expected not only provide communication between people, but also serve the massive equipment of the Internet of Things. For example: virtual reality, high-definition video services such as ultra-high-speed services, could cause data speed to reach 10 to 100 times currently available communication speeds. Another example use includes car networking and other services with low latency service requirements, in which end-to-end delay may have to be one fifth of the current network delays. Another example includes the Internet of things (IoT) that can access the current 1,000 times the number of businesses and terminals, and battery life can be extended to 10 times of typical battery life currently available.

The access control function is a basic function of the radio access network. A base station is able to control utilization of network bandwidth by user devices that the base station is serving. The base station may achieve this by sending control messages to the user devices in which the base station may inform the user devices of access control policies and restrictions that the user devices are to follow. In the currently deployed wireless networks such as the Long Term Evolution (LTE), the means for access control includes the base station side broadcasting the control parameters through the system broadcast message broadcast, the terminal reading the parameters in the system broadcast message, and the terminal performing the access control according to the parameters.

For the upcoming 5G standard, the following architecture is proposed:

The 5G network will be able to broadcast barring control information (i.e., a list of barring parameters associated with an Access Identity and an Access Category) in one or more areas of the radio access network (RAN).

The UE determines whether or nota particular new access attempt is allowed based on barring parameters that the UE receives from the broadcast barring control information and the configuration in the UE.

The unified access control (UAC) framework is currently applicable to UEs in radio resource control (RRC) states: RRC Idle, RRC Inactive, and RRC Connected at the time of initiating a new access attempt (e.g., new session request).

The current scheme covers UE states such as RRC-CONNECTED and RRC-INACTIVE. That is, the UE also performs access control on the service request in the RRC-connected state through the configuration information broadcast by the base station. If the network is congested, the network load can be alleviated by updating the UAC parameters to prevent the UE from triggering a new service. However, if the network suddenly becomes congested, it is difficult to control the access behavior of the UE during the congested phase due to the new configuration update of access control that must follow the system information block (SIB) update cycle (which has a long update period 80 msec or higher), and it is inevitable to consume the network during congestion resources. Currently available access control mechanisms have not yet taken into account the case of sudden congestion.

In case of the situation of sudden congestion, the handling of this situation in LTE is relatively simple: the AC parameters are not updated, and a second set of lines of defense is used to control this unexpected situation. That is, waiting for the UE to trigger the RRC connection establishment request, and controlling the access of the UE through the backoff parameter in the RRC rejection. However, this method does not work to bar new service attempt of the UE which is already in the connected state. This design is acceptable in limited situations where the primary goal of access control is to control IDLE state UEs. However, considering that more and more UEs are always connected and may be in an inactive state, it is beneficial to consider how to provide an alternative solution to help new radio (NR) solve the above problem.

The techniques described in the present document could be used in embodiments that allow a network node (e.g., gNB) to effectively perform sudden congestion control. For example, the congestion control may be performed in a time period that is shorter than that can be achieved by the broadcasting cycle of SIBs. While examples of LTE and 5G architecture are used to facilitate understanding, similar techniques may be practiced in wireless networks that use other wireless protocols.

Example Method 1

In this example, a UE (e.g., a terminal) may obtain access control parameters in RRC connected state by using an RRC dedicated message.

Examples of Network Side Behavior:

The base station uses an RRC dedicated message to notify the RRC connected terminal that the access control parameter informing the RRC connected state and/or the RRC inactivity state has changed.

TABLE 1

Parameters

RRC_CONNECTED/RRC_INACTIVE state access control parameter
Operator Information (public land mobile network (PLMN), etc.)
Unified Access Control Type (UAC category ID)
Access identities
Access control parameters (e.g., barring factor, barring time, barring bitmap) corresponding to the UAC category ID
Access control parameter (e.g., barring factor, barring time, barring bitmap) corresponding to the Access identities
Network slice information (network slice selection assistance information NSSAI, S-NSSAI, slice service type SST, slice differentiator SD, etc.)
New multimedia telephony service (MMTEL) voice or video session
SMS over IP, or SMS over NAS,
new PDU session establishment
PDU session modification,
RRC connection attitude,
Existing PDU session modification
service request to re-establish the user plane for an existing PDU session
Forbid a terminal from accessing network for a new service access attempt
Unbind (or exempt) a terminal from prohibition to access network for new service access attempt.

It should be noted that, the access control parameter for updating the RRC connection state (RRC_CONNECTED) by using the RRC dedicated message may occur at any moment. For example, the base station may update the access control parameters upon detecting congestion in the network.

Examples of Terminal Side Behavior Description:

If the terminal receives an RRC connection control message containing the RRC CONNECTED state (RRC_CONNECTED), and the parameter is the access control parameter corresponding to the uniform access control type and the access control parameter corresponding to the access ID, the terminal updates the corresponding access control parameter.

If the terminal receives the RRC connection control message containing RRC CONNECTED state (RRC_CONNECTED), and the parameter is to prohibit the terminal from entering a new service to the access network, the terminal checks whether the new is allowed to access the network according to the stored access control parameters.

If the terminal receives the RRC connection control message containing RRC CONNECTED state (RRC_CO-NNECTED) and the parameter is not the access control parameter corresponding to the uniform access control type and the access control parameter corresponding to the access ID, and the parameter is not forbidding the terminal from new service access of the network. The terminal disables the new service access network, for example, prohibits all new service access networks under the unified access control type in the RRC dedicated message configuration.

Example Method 2

This is an method for updating access control parameters with the terminal in in RRC Connected State and/or RRC Inactive State and/or RRC IDLE State Using a System Broadcast Message.
Examples of Network Side Behavior:
The base station notifies the terminal in the RRC connected state or the RRC inactive state or the RRC IDLE state using a paging indication and/or a paging message, and the access control parameter informing the RRC connected state and/or the RRC inactivity state and/or the RRC IDLE changes. The paging indication and/or the paging message include an RRC_CONNECTED/RRC_INACTIVE/RRC_IDLE state access control parameter change indication, where the indication includes one or a combination of parameters listed in Table 1.

It should be noted that, the access control parameters under the RRC_CONNECTED and RRC_ACTIVE and RRC_IDLE states may be updated by using the system broadcast message at any moment. Access parameters for RRC connection state and/or RRC inactivity state change are in remaining minimum system information (RMSI) and or other system information (OSI).
Examples of Terminal Side Behavior:
The terminal-side behavior features include one or a combination of the following options:
First Terminal Behavior Option:
If the terminal receives the paging indication and/or the paging message contains an RRC_CONNECTED/RRC_INACTIVE/RRC_IDLE state access control parameter change indication and indicates that the terminal is not permitted to both the new service access network and the new service access network forbidden terminal. The terminal immediately reads the next available RMSI and/or OSI information of the access control parameter that carries the RRC connection status and/or the RRC inactivity status and/or the RRC IDLE status change.

At the same time, the terminal may still continue to periodically read the scheduling information of the RMSI and/or OSI of the access parameter carrying the RRC connection state and/or the RRC inactivity state change in the system broadcast Message 1.
Second Terminal Behavior Option:
If the terminal receives the paging indication and/or the paging message contains an RRC_CONNECTED/RRC_INACTIVE/RRC_IDLE state access control parameter change indication, and the indication is not that the terminal is not allowed to both the new service access network and the terminal new service access network or the terminal receives the paging indication and/or the paging message includes an indication of actively acquiring the access control parameter, and the terminal triggers an RRC dedicated message to acquire the changed access control parameter from the network side.

Third Terminal Behavior Option:
If the terminal receives the paging indication and/or the paging message contains an RRC_CONNECTED/RRC_INACTIVE/RRC_IDLE state access control parameter change indication and the parameter is to forbid new service access of the terminal to the network, the terminal checks whether the new service connection is allowed according to the stored access control parameters into the network.

If the terminal receives the paging indication and/or the paging message contains an RRC_CONNECTED/RRC_INACTIVE/RRC_IDLE state access control parameter change indication, and the parameter prohibits the new service of the terminal from accessing the network, the terminal prohibits the corresponding new service from accessing the network.

It should be noted that, the terminal does not have to delete the session that the terminal has established simply because the message is received.

DESCRIPTION OF EMBODIMENT EXAMPLES

Example 1: RRC Dedicated Message Configuration Method

Figure 1:
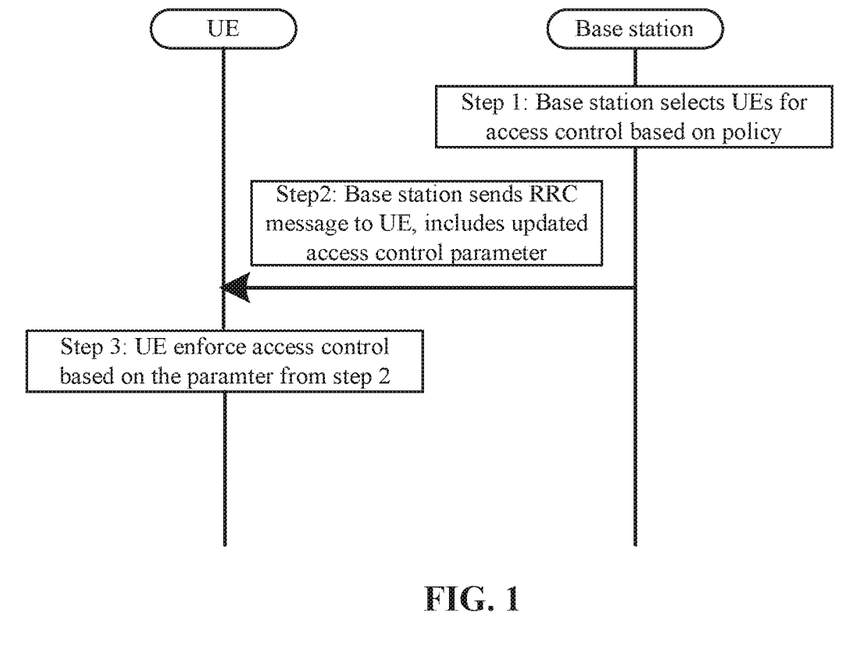
FIG. 1 depicts an example of messages exchanged in a wireless communication network.

Since the UE is in a connected state, a direct solution is to send the UE's configuration to the UE through an RRC reconfiguration message and cover or temporarily cover (a valid timer can be configured, and the timer reverts to the configuration in SIB). With reference to FIG. 1, the following messages may be exchanged.

Step 1: After the base station decides to change access control parameter, for example, when the base station identifies the situation of sudden congestion, all the terminals to be notified within the coverage area are identified according to the policy. For example, a base station policy requires that certain types of UEs in RRC-CONNECTED update access control parameters, requesting that these terminals immediately barred access to trigger new services. The base station selects, according to the policy and the algorithm, a terminal that needs to update the access control parameter.

Step 2: The base station sends an RRC dedicated message (for example, RRCReconfiguration) message to the terminal, which contains the updated access control parameters. These parameters can be one or a combination of the parameters as described previously.

For example, the network side needs to prohibit all new service requests with Access identities of 6 according to the decision of congestion at this moment. The base station will carry access control parameters with Access identities of 6 in the RRCReconfiguration message, including the barring factor, the barring time, the barring bitmap, and the like.

For another example, if the network side needs to prohibit the services of some network slices, the base station carries the parameters such as the S-NSSAI to the terminal through the RRCReconfiguration.

Step 3: The terminal performs access control according to the new access control parameters.

In RRC-CONNECTED The UE rejects the new service request to access the network according to the new parameters.

Before receiving the second step, the terminal checks whether the new service is allowed to be accessed according to the stored access control parameters.

After the terminal receives the configuration information sent by the base station in step 2.

If the configuration information contains access control parameters, the terminal saves the new access control parameters and checks them according to the new parameters.

If the configuration information includes parameters such as network slice information, the terminal identifies the service requests that belong to these types and prohibits these service accesses.

If the configuration information includes prohibiting the new service access network parameters of the terminal, the terminal saves the indication and prohibits any new service from accessing the network.

If the configuration information includes that the new service access network parameter of the terminal is prohibited from being removed, the terminal deletes the indication of prohibiting the new service access network of the terminal and checks whether the new service is allowed to access the network according to the stored access control parameters.

Example 2: Enhanced Broadcast Configuration Method (Avoiding Modification Period)

Figure 2:
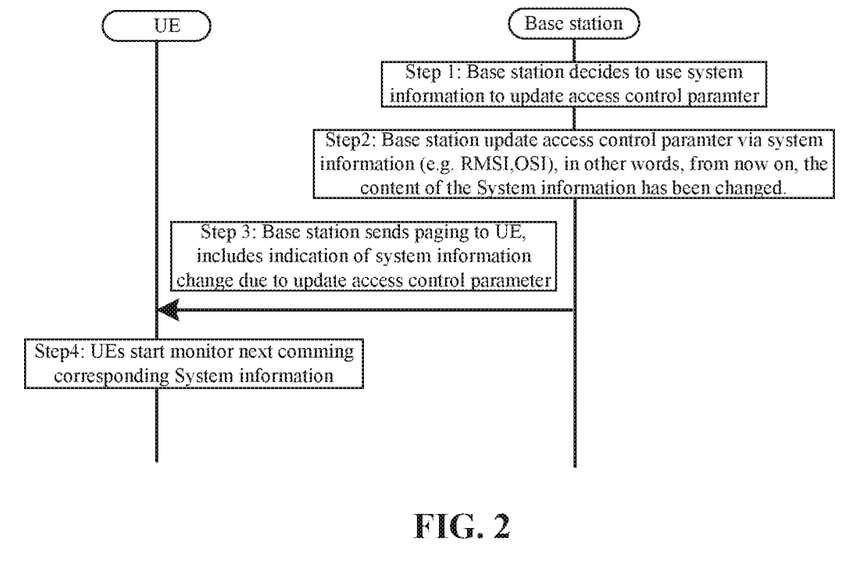
FIG. 2 depicts another example of messages exchanged in a wireless communication network.

This embodiment example describes a scenario of a second terminal behavior feature of the method of the present document. That is, the base station notifies the terminal by paging, and the terminal reads the immediate next access control information changed in the system broadcast message without waiting for the modification period to be read. This will thus speed up the terminal's reception of the latest access control parameters. With reference to FIG. 2, the following messages may be exchanged.

Step 1: The base station identifies a reason for changing access control parameters (e.g., sudden congestion), and the base station identifies the terminal type according to the policy, for example, the policy requires that the UE update the access control parameter for RRC_CONNECTED/RRC_INACTIVE/RRC_IDLE.

The base station selects to update the method for the terminal to accept the control parameter through the broadcast message.

Step 2: The base station updates the corresponding system broadcast message parameters in the system broadcast message.

Step 3: The base station sends a page to the terminal, including RRC_CONNECTED/RRC_INACTIVE/RRC_IDLE state access control parameter change indication.

The paging indication and/or the paging message include an RRC_CONNECTED/RRC_INACTIVE/RRC_IDLE state access control parameter change indication, where the indication includes one or a combination of the parameters listed in Table 1.

It should be noted that, the terminal does not have to delete the established session simply because of receiving the instruction.

It should be noted that, the access control parameters under the RRC_CONNECTED and RRC_INACTIVE states may be updated by using the system broadcast message at any moment. Access parameters for RRC connection state and or RRC inactivity state change are in RMSI and or OSI.

Step 4: If the terminal receives the paging indication and/or the paging message contains an RRC_CONNECTED/RRC_INACTIVE/RRC_IDLE state access control parameter change indication, and the indication is not that the new service access network of the terminal is not forbidden and the new service access network of the terminal is not forbidden Type, the terminal immediately reads the RMSI and/or OSI information of the access control parameter that carries the RRC connection status and/or the RRC inactivity status change.

The UE under the state information does not need to wait for the update period of the system broadcast message, and directly reads and saves the access control parameter. The UE terminal in RRC-CONNECTED/RRC-INACTIVE/RRC_IDLE rejects the new service request to access the network according to the new parameters.

At the same time, the terminal still continues to periodically read the scheduling information of the RMSI and/or OSI of the access parameter carrying the RRC connection state and/or the RRC inactivity state change in the system broadcast message 1.

Example 3: Enhanced Broadcast Configuration Method (Trigger UE to Request)

Figure 3:
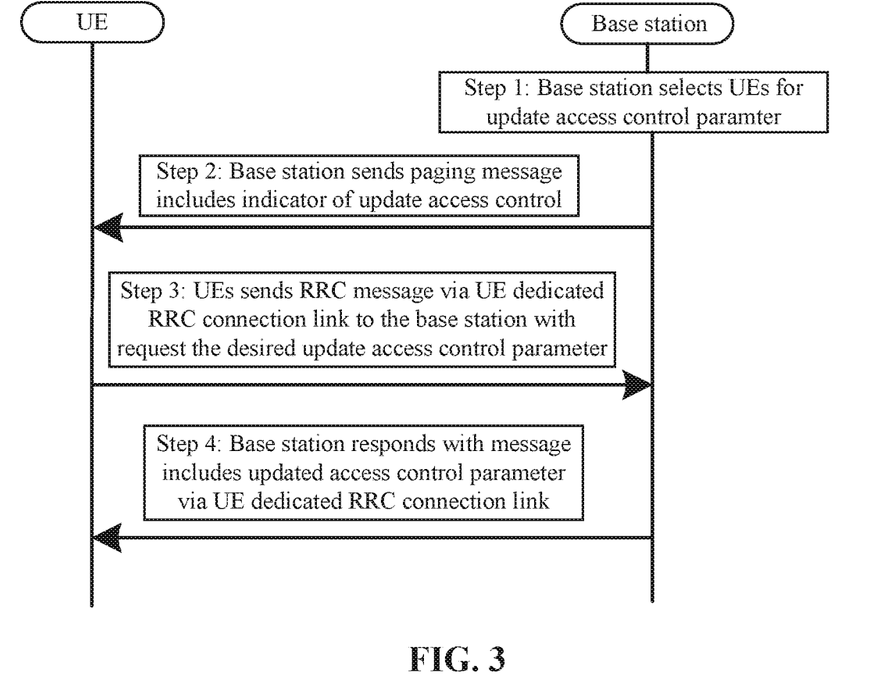
FIG. 3 depicts another example of messages exchanged in a wireless communication network.

This embodiment describes a scenario of generating a second terminal behavior. That is, the base station notifies the terminal by paging, and the terminal acquires the changed access control information from the base station by triggering the RRC dedicated message. This method thus speeds up the terminal to obtain updated access control parameters. With reference to FIG. 3, the following messages may be exchanged.

Step 1: The base station identifies the burst congestion, and the base station identifies the user according to the policy, for example, the policy requires the UE to update the access control parameter for RRC-CONNECTED/RRC-INACTIVE.

The base station selects a method for triggering the terminal to actively acquire the update access control parameter.

Step 2: The base station does not update the corresponding system broadcast message parameters in the system broadcast message. The base station sends a page to the terminal including RRC_CONNECTED/RRC_INACTIVE state access control parameter change indication.

The paging indication and/or the paging message include an RRC_CONNECTED/RRC_INACTIVE state access control parameter change indication, where the indication includes one or a combination of the parameters listed in Table 1:

Take the initiative to receive the control parameter indicates that the terminal is required to actively trigger the RRC dedicated message after receiving the instruction to obtain the changed access control parameter from the base station side.

Step 3: The terminal triggers the RRC dedicated message (requests for the changed access control parameters)

Step 3: If the terminal receives the paging indication and/or the paging message contains an RRC_CONNECTED/RRC_INACTIVE state access control parameter change indication, the indication is not forbidding the new service access network of the terminal and the new service access network of the forbidden terminal to be prohibited Type; or the terminal receives the paging indication and/or the paging message includes an indication of actively acquiring access control parameters, and the terminal triggers an RRC dedicated message to acquire the changed access control parameters from the network side.

For example, the terminal may request the base station to provide the changed access control parameters by using an RRC dedicated message such as UE INFORMATION.

Step 4: The base station includes the changed access control parameters in the response message according to the request of the terminal.

After the terminal receives the message from the base station, the UE in RRC-CONNECTED/RRC-INACTIVE rejects the new service request to access the network according to the new parameters.

Example 4: Enhanced Broadcast Configuration Method (No Access, No Feedback)

Figure 4:
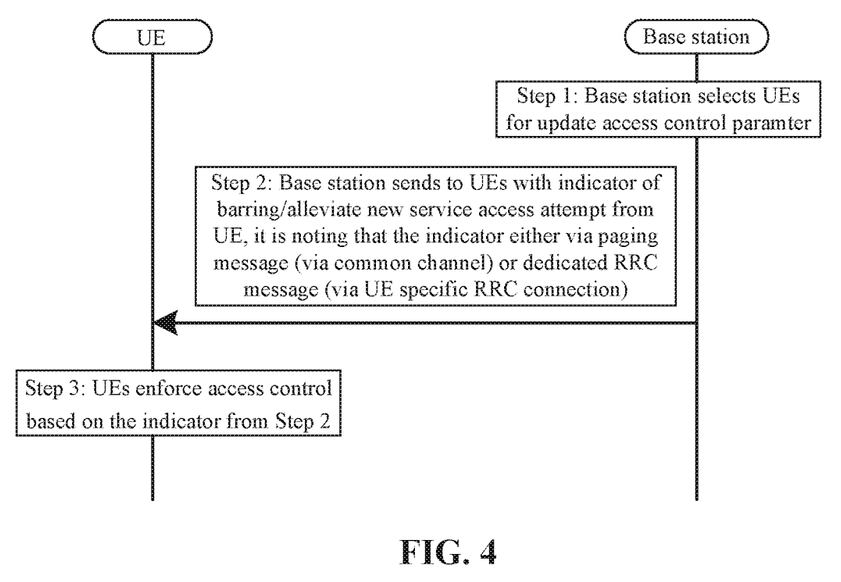
FIG. 4 depicts another example of messages exchanged in a wireless communication network.

That is, the base station notifies the terminal by paging, and the terminal prohibits or releases the new service request according to the instruction. Accelerate the terminal response to network congestion problems. This method thus effectively alleviate the problem of network congestion. With reference to FIG. 4, the following messages may be exchanged.

Step 1: The base station identifies the burst congestion, and the base station identifies the user according to the policy, for example, the policy requires the UE to update the access control parameter for RRC-CONNECTED/RRC-INACTIVE/RRC-IDLE.

The base station chooses to trigger the terminal to directly disable/unblock the trigger of a new service request.

Step 2: The base station does not update the corresponding system broadcast message parameters in the system broadcast message. The base station sends a page to the terminal, including RRC_CONNECTED/RRC_INACTIVE/RRC-IDLE state access control parameter change indication or base station sends RRC dedicated RRC message to UE in RRC_CONNECTED/RRC_INACTIVE.

The paging indication and/or the paging message or the dedicated RRC message include an RRC_CONNECTED/RRC_INACTIVE/RRC-IDLEstate access control parameter change indication, where the indication includes one or a combination of the parameters listed in Table 1:

Unblock the terminal new service access network means that the terminal no longer forbids the establishment of a new session. The terminal performs the access control check according to the access control parameters configured in the system broadcast message.

Step 3: The terminal performs access control according to the instruction information obtained in step 2

If the terminal receives the paging indication and/or the paging message or dedicated RRC message contains an RRC_CONNECTED/RRC_INACTIVE/RRC_IDLE state access control parameter change indication and the parameter is to forbid new service access of the terminal to the network, the terminal checks whether the new service connection is allowed according to the stored access control parameters into the network.

If the terminal receives the paging indication and/or the paging message contains an RRC_CONNECTED/RRC_INACTIVE/RRC_IDLE state access control parameter change indication, and the parameter prohibits the new service of the terminal from accessing the network, the terminal prohibits the corresponding new service from accessing the network.

Figure 5:
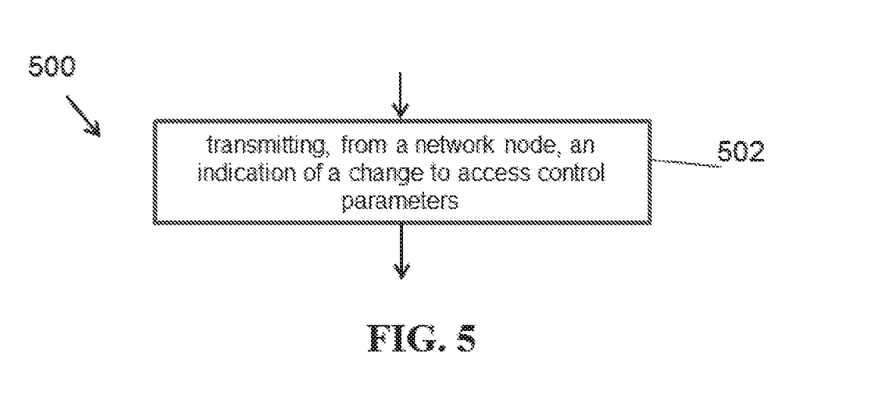
FIG. 5 is a flowchart of an example method of wireless communication.

FIG. 5 shows a flowchart of an example method 500 of wireless communication. The method 500 includes transmitting (502), from a network node, an indication of a change to access control parameters, wherein the indication includes one or more of an operator information, a unified access control type, access identities, network slice information, session information, an indication to prohibit new service access attempt, an indication to alleviate prohibition of new service access attempt and a radio resource control state. For example, the network node decide to change the access control parameters to alleviate a congestion in the network. In some embodiments, the indication is transmitted to a user device in a radio resource control connected state using a dedicated radio resource link message. In some embodiments, the indication is broadcast to a user device in a radio resource control connected or inactive state. In some embodiments the network node may also transmit the updated access parameters in subsequent RMSI or OSI messages. In some embodiments, the method 500 may further include transmitting, from the network node, updated access control parameters via dedicated radio resource link message, in response to receiving a dedicated message from a user equipment indicating that the user equipment wishes to acquire new access control parameters. In some embodiments, the network node may use the method 500 to perform congestion control in the network. In some embodiments, the transmitting the indication is performed by sending a dedicated message to a user device. In some embodiments, the transmitting the indication may be performed by transmitting a broadcast message to the wireless network.

Figure 6:
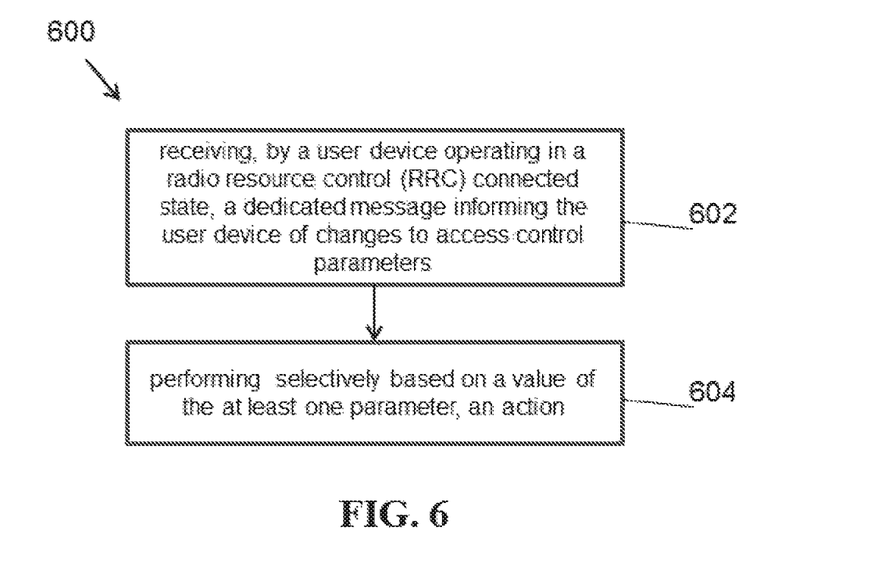
FIG. 6 is a flowchart of an example method of wireless communication.

FIG. 6 is a flowchart for an example method 600 of wireless communication. The method includes receiving (602), by a user device operating in a radio resource control (RRC) connected state, a dedicated message informing the user device of changes to access control parameters, the dedicated message include at least one parameter. The method 600 includes performing (604), selectively based on a value of the at least one parameter at least one of the following actions: (a) in response to the parameter corresponds to a uniform access control type, updating a locally stored copy of the parameter, (b1) in response to the parameter indicates that the user device is exempted from prohibiting establishing a new service, then checking whether the new service can be established using the locally stored copy of the parameter, and (b2) otherwise, prohibiting new services access attempt from accessing network.

Figure 7:
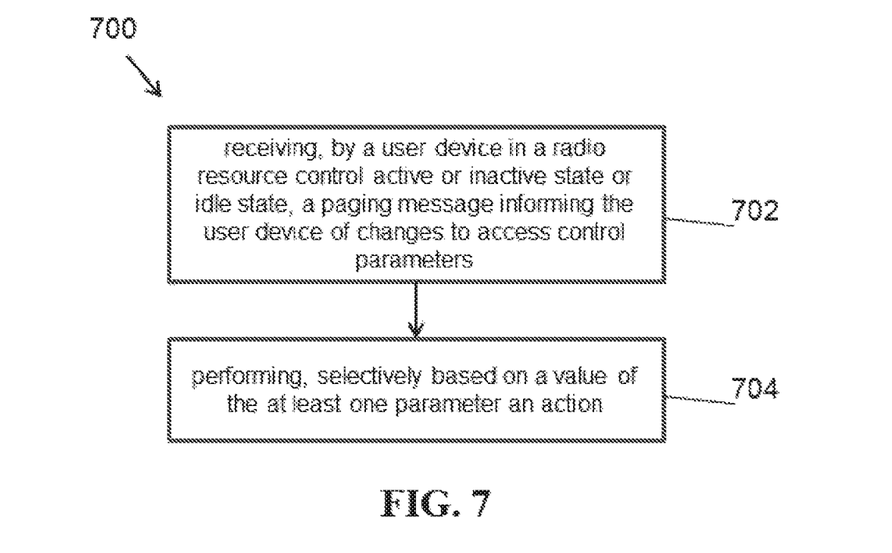
FIG. 7 is a flowchart of an example method of wireless communication.

FIG. 7 is a flowchart for a method 700 of wireless communication. The method includes receiving, by a user device in a radio resource control active or inactive state or idle state, a paging message informing the user device of changes to access control parameters, the paging message include at least one parameter. The method 700 includes performing, selectively based on a value of the at least one parameter at least one of the following actions: (a) in response to the indication that access control parameter has been changed, reading a next RMSI or OSI information of access control parameter that carries a connected/inactivity status change and updating a locally stored copy of the parameter, (b) in response to the value indicating that access control parameter has been changed, then transmitting a dedicated message to acquire new access control parameters, (c) in response to the value indicating that the user device is not permitted new service access attempt, then prohibiting a new service access attempt from accessing network, and (d) in response to the indication that terminal is exempted from prohibit new service access attempt, then check whether new service connection is allowed using stored control parameters.

Figure 8:
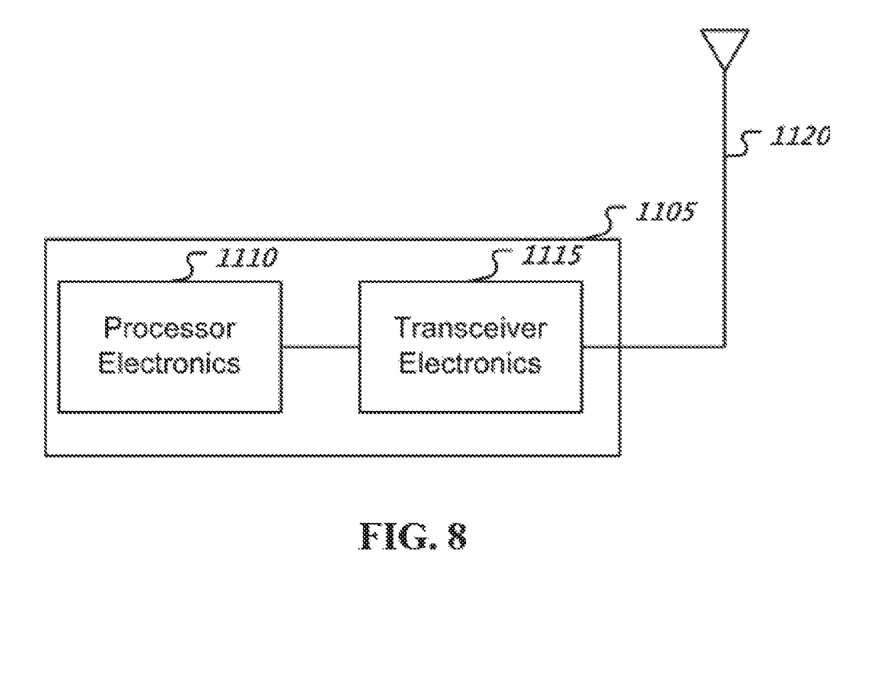
FIG. 8 shows an example of a wireless communication apparatus.

FIG. 8 illustrates an example apparatus 1105 that may implement a method or technique described in the present document (e.g., method 500, 600 or 700). The apparatus 1105 may include processor electronics 1110 configured to execute instructions. The apparatus 1105 may include transceiver electronics 1115 configured to transmit or receive messages on a wireless channel. The apparatus 1105 may include one or more antennas 1120 for the wireless communication. The apparatus 1105 may include a memory (not shown) that stores data and code for the operation of the apparatus 1105.

Figure 9:
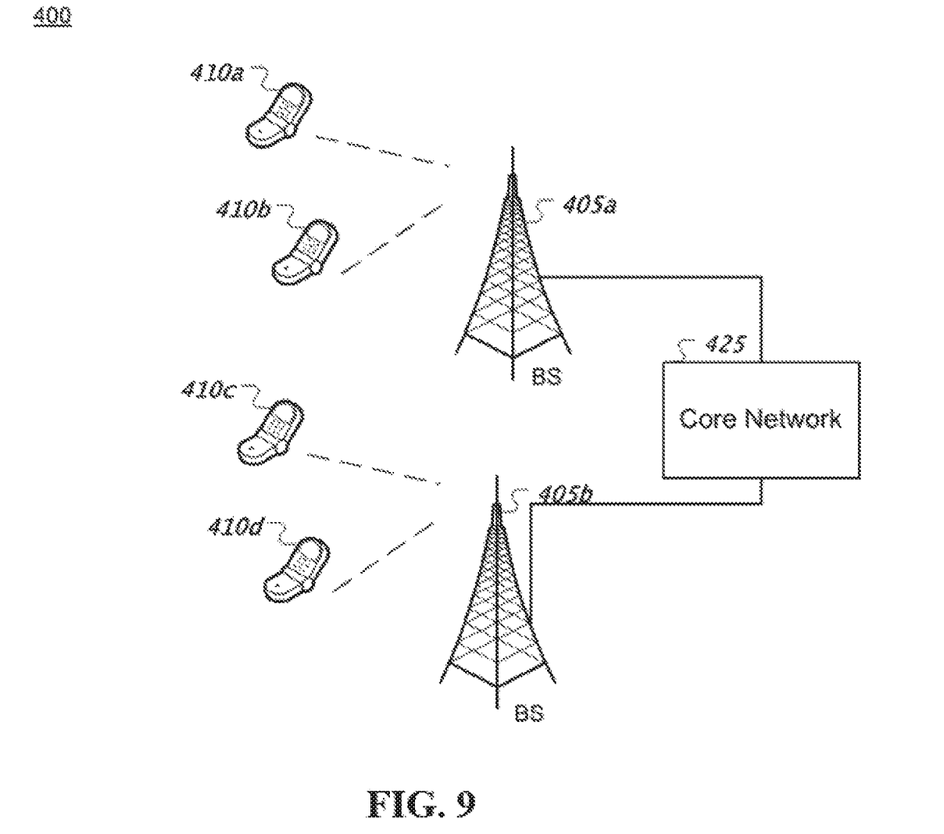
FIG. 9 shows an example of a wireless communication network.

FIG. 9 shows an example of a wireless communication system where techniques in accordance with one or more embodiments of the present technology can be applied. A wireless communication system 400 can include one or more base stations (BSs) 405*a*, 405*b*, one or more wireless devices 410*a*, 410*b*, 410*c*, 410*d*, and a core network 425. A base station 405*a*, 405*b* can provide wireless service to wireless devices 410*a*, 410*b*, 410*c* and 410*d* in one or more wireless sectors. In some implementations, a base station 405*a*, 405*b* includes directional antennas to produce two or more directional beams to provide wireless coverage in different sectors.

The core network 425 can communicate with one or more base stations 405*a*, 405*b*. The core network 425 provides connectivity with other wireless communication systems and wired communication systems. The core network may include one or more service subscription databases to store information related to the subscribed wireless devices 410*a*, 410*b*, 410*c*, and 410*d*. A first base station 405*a* can provide wireless service based on a first radio access technology, whereas a second base station 405*b* can provide wireless service based on a second radio access technology. The base stations 405*a* and 405*b* may be co-located or may be separately installed in the field according to the deployment scenario. The wireless devices 410*a*, 410*b*, 410*c*, and 410*d* can support multiple different radio access technologies.

It will be appreciated by one of skill in the art that techniques for changing access control parameters in a wireless network are disclosed.

From the foregoing, it will be appreciated that specific embodiments of the invention have been described herein for purposes of illustration, but that various modifications may be made without deviating from the scope of the invention. Accordingly, the invention is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of wireless communication, comprising:
   receiving, by a user device in a radio resource control (RRC) active or inactive state or idle state, a paging message informing the user device of changes to access control parameters, the paging message include at least one parameter, wherein the paging message is received from a base station during a congestion control condition in which the access control parameters are changed; and
   in response to a value of the at least one parameter indicating that the user device is not permitted new service access attempt during the congestion control condition, prohibiting a new service access attempt from accessing network; and
   in response to the value indicating that the user device is exempted from prohibiting new service access attempt during the congestion control condition, checking whether new service connection is allowed using stored control parameters.

2. The method of claim 1, wherein in response to the value indicating that access control parameter has been changed, transmitting a dedicated message to acquire new access control parameters.

3. The method of claim 1, wherein the access control parameter includes public land mobile network (PLMN), a unified access control category identifier (ID), or network slice information.

4. The method of claim 1, wherein the access control parameter includes a service request to re-establish a user plane for an existing protocol data unit (PDU) session.

5. A wireless communication apparatus comprising a processor configured to implement a method comprising:
   receive, by a user device in a radio resource control (RRC) active or inactive state or idle state, a paging message informing the user device of changes to access control parameters, the paging message include at least one parameter, wherein the paging message is received from a base station during a congestion control condition in which the access control parameters are changed; and
   perform, selectively based on a value of the at least one parameter, any one or more of following actions:
   in response to a value of the at least one parameter indicating that the user device is not permitted new service access attempt during the congestion control condition, prohibit a new service access attempt from accessing network; and
   in response to the value indicating that the user device is exempted from prohibiting new service access attempt during the congestion control condition, check whether new service connection is allowed using stored control parameters.

6. The wireless communication apparatus of claim 5, wherein in response to the value indicating that access control parameter has been changed, the processor is configured to transmit a dedicated message to acquire new access control parameters.

7. The wireless communication apparatus of claim 5, wherein the access control parameter includes public land mobile network (PLMN), a unified access control category identifier (ID), or network slice information.

8. The wireless communication apparatus of claim 5, wherein the access control parameter includes a service request to re-establish a user plane for an existing protocol data unit (PDU) session.

* * * * *

UNITED STATES PATENT AND TRADEMARK OFFICE
CERTIFICATE OF CORRECTION

PATENT NO. : 11,477,722 B2
APPLICATION NO. : 16/925127
DATED : October 18, 2022
INVENTOR(S) : Dapeng Li et al.

It is certified that error appears in the above-identified patent and that said Letters Patent is hereby corrected as shown below:

In the Drawings

In Fig. 1, Sheet 1 of 5, delete "Step2:" and insert -- Step 2: --, therefor.

In Fig. 1, Sheet 1 of 5, in Step "3", Line 2, delete "paramter" and insert -- parameter --, therefor at each occurrence throughout the figures.

In Fig. 2, Sheet 1 of 5, delete "Step2:" and insert -- Step 2: --, therefor.

In Fig. 2, Sheet 1 of 5, delete "Step4:" and insert -- Step 4: --, therefor.

In the Specification

In Column 1, Line 8, delete "international" and insert -- International --, therefor.

In Column 2, Line 48, delete "communication," and insert -- communication. --, therefor.

In Column 2, Line 67, delete "only" and insert -- only to --, therefor.

In Column 3, Line 33, delete "nota" and insert -- not a --, therefor.

In Column 5, Line 15, delete "in in" and insert -- in --, therefor.

In Column 5, Line 31, delete "RRC_ACTIVE" and insert -- RRC_INACTIVE --, therefor.

In Column 5, Lines 35-36, delete "and or" and insert -- and/or --, therefor.

In Column 7, Line 61, delete "and or" and insert -- and/or --, therefor.

In Column 7, Line 61, delete "and or" and insert -- and/or --, therefor.

Signed and Sealed this
Twenty-seventh Day of June, 2023

Katherine Kelly Vidal
*Director of the United States Patent and Trademark Office*

CERTIFICATE OF CORRECTION (continued)
U.S. Pat. No. 11,477,722 B2

In Column 8, Line 53, delete "parameters)" and insert -- parameters). --, therefor.

In Column 9, Line 35, delete "RRC-IDLEstate" and insert -- RRC-IDLE state --, therefor.

In Column 9, Line 44, delete "step 2" and insert -- step 2. --, therefor.

In Column 11, Line 39, delete "except as" and insert -- except --, therefor.

In Column 11, Line 55, delete "them." and insert -- of them. --, therefor.

In Column 12, Lines 46-47, delete "CD ROM" and insert -- CD-ROM --, therefor.